(12) United States Patent
Ferrara, Jr.

(10) Patent No.: US 6,412,724 B1
(45) Date of Patent: Jul. 2, 2002

(54) REEL ESPECIALLY ADAPTED FOR FLY FISHING

(76) Inventor: Daniel A. Ferrara, Jr., 221 Looking Glass Hill Rd., Morris, CT (US) 06763

( * ) Notice: Subject to any disclaimer, the term of this patent is extended or adjusted under 35 U.S.C. 154(b) by 0 days.

(21) Appl. No.: 09/848,040

(22) Filed: May 3, 2001

(51) Int. Cl.⁷ .............................................. A01K 89/00
(52) U.S. Cl. ..................................... 242/322; 242/317
(58) Field of Search ................................. 242/322, 317

(56) References Cited

U.S. PATENT DOCUMENTS

| | | | | |
|---|---|---|---|---|
| 1,697,850 A | * | 1/1929 | Case ........................... | 242/322 |
| 2,535,746 A | * | 12/1950 | Mitchell ....................... | 242/322 |
| 4,076,185 A | * | 2/1978 | Dorph .......................... | 242/322 |
| 4,418,877 A | * | 12/1983 | Nakajima ...................... | 242/322 |
| 4,542,862 A | * | 9/1985 | Romike et al. ................. | 242/322 |
| 4,715,554 A | * | 12/1987 | Kuntze ......................... | 242/322 |
| 4,733,830 A | * | 3/1988 | Hollander ..................... | 242/322 |
| 5,161,751 A | * | 11/1992 | Bolcavage ..................... | 242/322 |
| 5,333,813 A | * | 8/1994 | Hirano ......................... | 242/322 |

* cited by examiner

*Primary Examiner*—Emmanuel M. Marcelo
(74) *Attorney, Agent, or Firm*—Dallett Hoopes

(57) ABSTRACT

A spool for a fishing reel comprising at least two side-by-side arbors of different diameters separated by a dividing wall having a diameter larger than the diameter of the larger of the arbors.

10 Claims, 2 Drawing Sheets

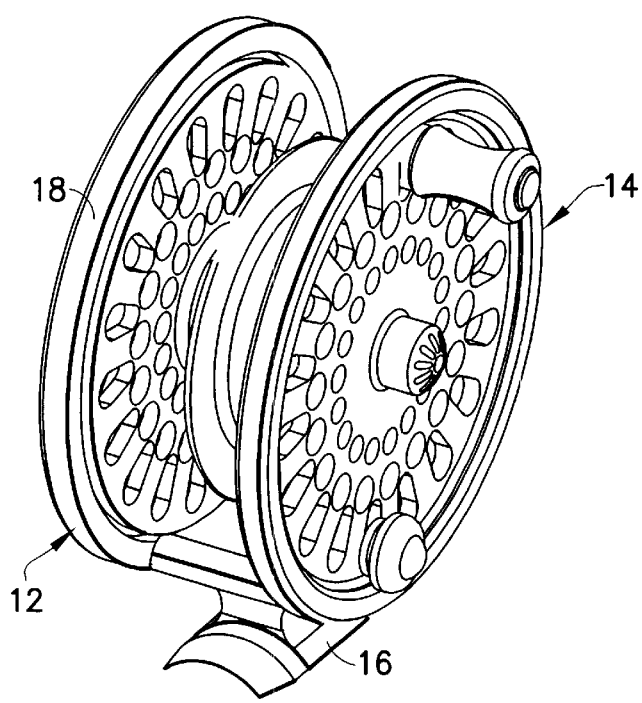
FIG.1
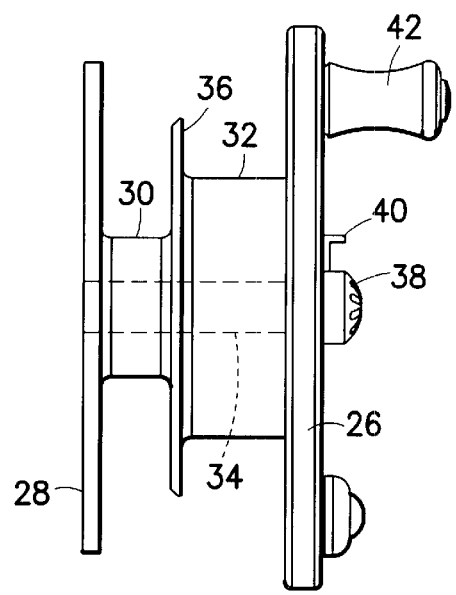
FIG.2
FIG.3
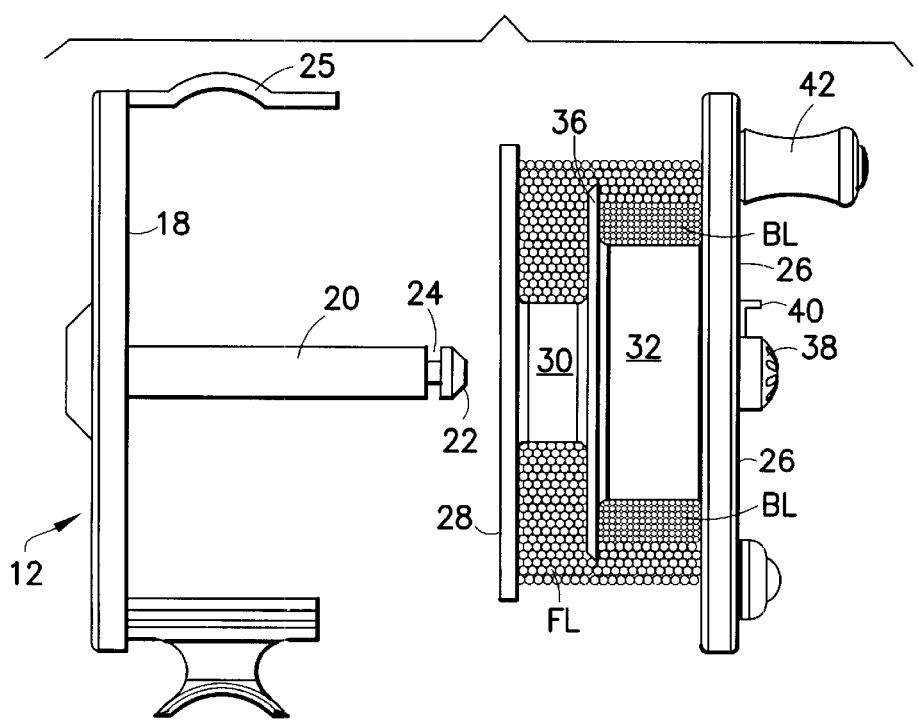

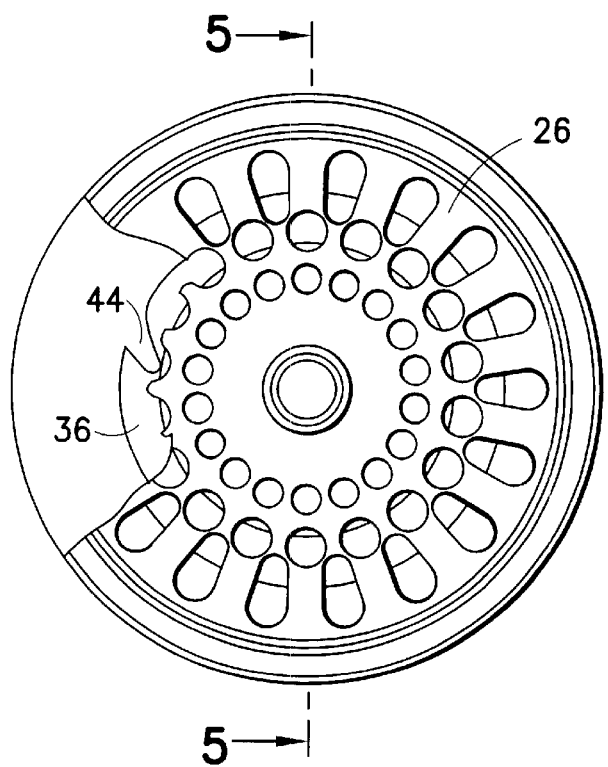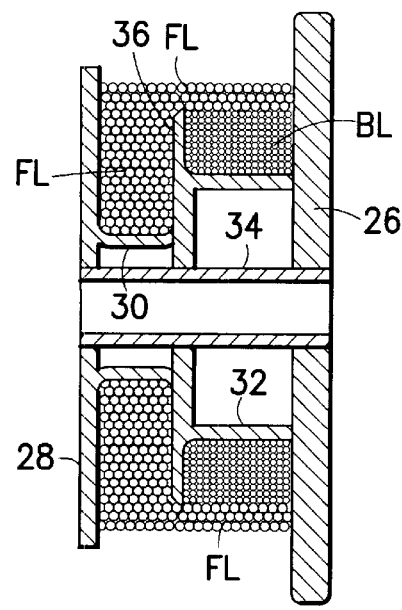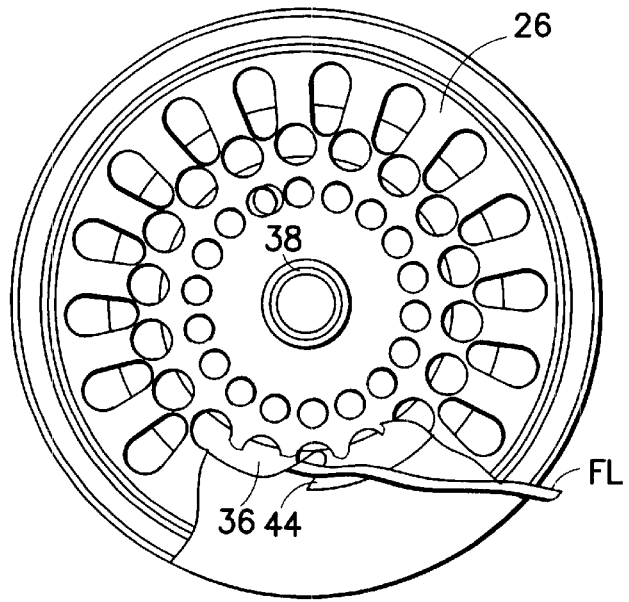

REEL ESPECIALLY ADAPTED FOR FLY FISHING

FIELD OF THE INVENTION

This invention relates to fishing reels. More specifically, this invention relates to reels used in fly fishing.

BACKGROUND OF THE INVENTION

Some fly fishing reels of recent manufacture have featured spools with arbors of large diameter to facilitate retrieval of line and fast reeling of the fish. The reels have accommodated, aside from the usual casting line, an underlying ample supply of backing line to be used if the fish should run out beyond the length of regular fly line. The backing line is finer than the regular line and is not normally involved in casting. With all this line, the outer diameter of the large arbor reel has made it unwieldy and awkward to handle. There has been a need for a reel having a more compact size with faster backing line retrieval.

SUMMARY OF THE INVENTION

The invention is based on the idea that rapid reeling in of backing line is called for, because a big fish is often fighting at a greater distance where the fly line is all the way out and the reel is working on the backing line. The invention is a spool for a fishing reel comprising at least two side-by-side arbors of different diameters separated by a dividing wall having a diameter large than the diameter of the larger of the arbors. The wall may be notched to facilitate the shifting of the fly line from the larger arbor to the smaller arbor.

This invention is a compromise to the large arbor reel. It provides a faster retrieval of the backing and most of the fly line and a reel similar in dimension to that of a standard fly reel.

BRIEF DESCRIPTION OF THE DRAWINGS

Further objects and features of the invention will be clear to those skilled in the art from a review of the following specification and drawings, all of which present a non-limiting form of the invention. In the drawings:

FIG. 1 is a perspective view of a fishing reel assembly incorporating my new design;

FIG. 2 is a rear elevational view of a spool embodying the invention;

FIG. 3 is an exploded view of the assembly showing the line in section;

FIG. 4 is a side elevation partly broken away to show the transfer notch;

FIG. 5 is a simplified sectional view taken on the line 5—5 of FIG. 4 showing casting line and backing line in place;

FIG. 6 is a view similar to FIG. 4 but rotated and showing the fly line being shifted by the transfer notch after the backing has filled the smaller arbor.

DESCRIPTION OF THE PREFERRED EMBODIMENT

A fly casting reel embodying the invention is designated 10 in FIG. 1. It comprises a frame 12 and a spool 14. The frame includes a foot 16 and a side disc 18 extending up from a side of the foot.

As best shown in FIG. 3, a spindle 20 extends rightward from the center of the side disc 18 over the foot and spaced thereabove. The spindle 20 is tapered at its distal end 22 and formed with a conventional locking groove 24. A line guard 25 extends out from the disc 18 above the spindle 20.

The spool 14 includes the outer side disc 26 and the inner side disc 28 held in spaced relation by a pair of side-by-side arbors 30, 32. The side discs 26, 28 are centrally apertured and connected by a mounting bushing 34. The two arbors are separated by a centrally apertured dividing wall 36 which has a diameter larger than the larger arbor 32. The spool also comprises the usual quick-release cover 38 and quick-release lever 40 and the reeling knob 42, all conventional.

The arbors 30, 32 are of different diameters as shown (FIG. 2) and the dividing wall 36 has a diameter larger than the diameter of the larger arbor 32. As shown in FIGS. 4 and 6, the dividing wall 36 is formed with a deflecting cut-out or notch 44 which extends part way down to the level of the larger arbor 32. The notch is slanted in a direction opposing the reeling-in direction of rotation. The notch may also be in the form of a protrusion.

In use, the spool 14 is inserted on the spindle 20 and locked in position by the lever or catch 40 in the customary fashion. The end of the backing line BL (FIG. 5) is tied to the larger arbor 32 and the spool is reeled to fill up the space between the side disc 26 and the dividing wall 36. As the backing line partly fills the larger arbor 32, at some point near the bottom of the notch 44 the fly line FL, secured to the end of the backing line BL, begins to accumulate. After a few rotations of the spool, the notch 44 picks up the fly line FL and the fly line shifts to the smaller arbor 30. The fly line quickly fills the annular pocket surrounding the smaller arbor 30. Thereafter the fly line fills evenly on both sides of wall 36 up to its final capacity.

During casting, the casting line CL is worked off the top layers of the spool and extends outward off the rod. When a strike occurs, the fish will run, stripping the fly line FL from the spool, the line FL easily moving through the notch 44 to the backing line on larger arbor 32. If the fish continues away, the backing line BL may be drawn off the spool as necessary. The fisherman can rapidly reel in the backing line using the larger diameter of the larger arbor 32.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A spool for a fly fishing reel comprising at least two side-by-side arbors of different diameters separated by a dividing wall having a diameter larger than the diameter of the larger of the arbors, the larger arbor having finer backing line wound thereon, the smaller arbor having thicker casting line, connected to an end of the finer line, wound thereon.

2. A spool as claimed in claim 1 wherein the dividing wall has a circular periphery and is formed with a deflecting notch in its periphery.

3. A spool as claimed in claim 2 wherein the notch is angled in a direction opposite the reel-in direction of the spool.

4. A fishing reel comprising a frame including a foot adapted to be secured to a rod and a side disc extending up from one side of the foot, the side disc having a central spindle spaced above the foot, the spindle rotatably receiving the spool as claimed in claim 1.

5. A fishing reel as claimed in claim 4 wherein the dividing wall has a circular periphery and is formed with a deflecting notch in its periphery.

6. A fishing reel as claimed in claim 5 wherein the notch is angled in a direction opposite the reel-in direction of the spool.

7. A spool for a fly fishing reel comprising at least two side-by-side arbors of different diameters separated by a dividing wall having a diameter larger than the diameter of the larger of the arbors, the dividing wall having a circular periphery and formed with a deflecting notch in its periphery.

8. A spool as claimed in claim 7 wherein the notch is angled in a direction opposite the reel-in direction of the spool.

9. A fishing reel as claimed in claim 7 comprising a frame including a foot adapted to be secured to a rod and a side disc extending up from one side of the foot, the side disc having a central spindle spaced above the foot, the spindle rotatably receiving the spool as claimed in claim 1.

10. A fishing reel as claimed in claim 9 wherein the notch is angled in a direction opposite the reel-in direction of the spool.

* * * * *